US012664438B1

(12) United States Patent
Vetzler et al.

(10) Patent No.: US 12,664,438 B1
(45) Date of Patent: Jun. 23, 2026

(54) COMPUTATIONALLY EFFICIENT REASONING LANGUAGE MODELS

(71) Applicant: Intuit Inc., Mountain View, CA (US)

(72) Inventors: Matan Vetzler, Ramat Gan (IL); Shai Ardazi, Petah Tikva (IL); Linoy Cohen, Petah Tikva (IL); Kfir Aharon, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/204,387

(22) Filed: May 9, 2025

(51) Int. Cl.
G06N 3/092 (2023.01)
(52) U.S. Cl.
CPC .................................... G06N 3/092 (2023.01)
(58) Field of Classification Search
CPC ................................ G06N 3/092; G06N 20/00
See application file for complete search history.

(56) References Cited

U.S. PATENT DOCUMENTS

2025/0117582 A1* 4/2025 Malon ...................... G06F 40/40
2026/0057265 A1* 2/2026 Yu ............................. G06N 7/00

OTHER PUBLICATIONS

Li et al., "Toward Sustainable GenAI using Generation Directives for Carbon-Friendly Large Language Model Inference," 2024, arXiv:2403.12900v1 (Year: 2024).*
Kimi Team, "Kimi K1.5: Scaling Reinforcement Learning with LLMs," Mar. 2025, arXiv:2501.12599v2 (Year: 2025).*
SuperAnnotate, "How to improve dataset quality for LLM fine-tuning [+code guide]," 2024, https://www.superannotate.com/blog/how-to-improve-llm-fine-tuning-dataset-quality (Year: 2024).*
Chen et al., "Do NOT Think That Much for 2+3=? On the Overthinking of o1-Like LLMs," Feb. 2025, arXiv:2412.21187v2 (Year: 2025).*
Schuster, "Accelerating text generation with Confident Adaptive Language Modeling (CALM)," 2022, https://research.google/blog/accelerating-text-generation-with-confident-adaptive-language-modeling-calm/ (Year: 2022).*
Feng et al., "Efficient Reasoning Models: A Survey," Apr. 2025, arXiv:2504.10903v1 (Year: 2025).*
Samuylova, "LLM evaluation metrics and methods, explained simply," Apr. 2025, https://www.evidentlyai.com/llm-guide/llm-evaluation-metrics (Year: 2025).*
Guo et al., "When to Stop? Towards Efficient Code Generation in LLMs with Excess Token Prevention," 2024, arXiv:2407.20042v1 (Year: 2024).*

(Continued)

*Primary Examiner* — Michael J Huntley
*Assistant Examiner* — Vincent Anton Spraul
(74) *Attorney, Agent, or Firm* — Lathrop GPM LLP

(57) ABSTRACT

A method including receiving a query to a reasoning language model (RLM). The method also includes executing the RLM on the query. During executing, the RLM generates a first intermediate output and a second intermediate output. The method also includes executing, prior to generating a next intermediate output, a classification model on the second intermediate output to generate a prediction that the second intermediate output is redundant to the first intermediate output. The method also includes commanding, responsive to the prediction, the RLM to cease generating intermediate outputs. The method also includes commanding RLM to transmit the first intermediate output as a final output.

7 Claims, 6 Drawing Sheets

(56)            References Cited

OTHER PUBLICATIONS

Fatemi et al., "Concise Reasoning via Reinforcement Learning,"
Apr. 2025, arXiv:2504.05185v1 (Year: 2025).*
Liu et al., "Length Desensitization in Direct Preference Optimiza-
tion," 2024, arXiv:2409.06411v2 (Year: 2024).*
Yang et al., "Think When You Need: Self-Adaptive Chain-of-
Thought Learning," Apr. 2025, arXiv:2504.03234v1 (Year: 2025).*
Rafailov, R., et al., "Direct Preference Optimization: Your Language
Model is Secretly a Reward Model", Jul. 29, 2024, 27 pages.

* cited by examiner

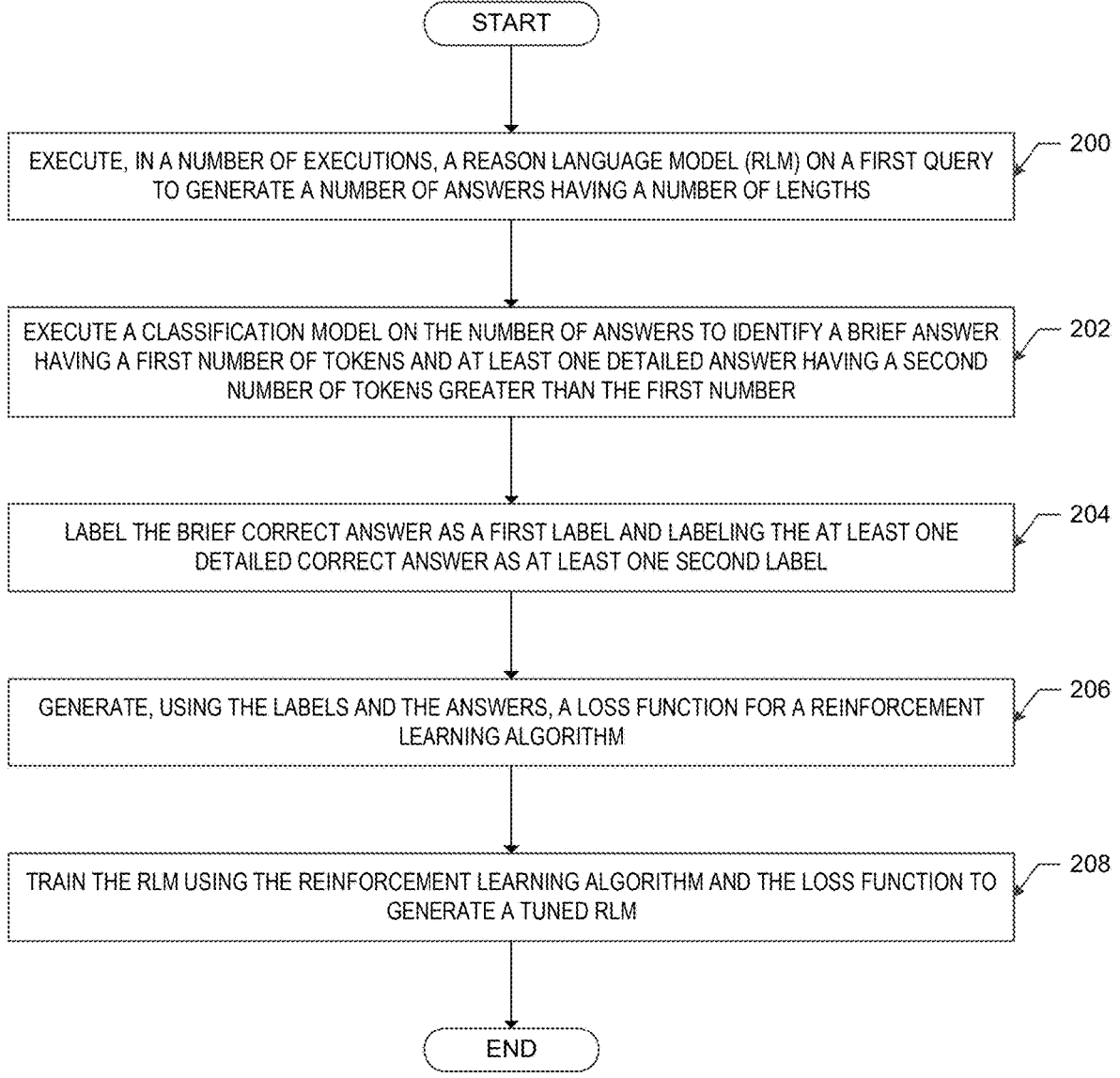

START

EXECUTE, IN A NUMBER OF EXECUTIONS, A REASON LANGUAGE MODEL (RLM) ON A FIRST QUERY TO GENERATE A NUMBER OF ANSWERS HAVING A NUMBER OF LENGTHS — 200

EXECUTE A CLASSIFICATION MODEL ON THE NUMBER OF ANSWERS TO IDENTIFY A BRIEF ANSWER HAVING A FIRST NUMBER OF TOKENS AND AT LEAST ONE DETAILED ANSWER HAVING A SECOND NUMBER OF TOKENS GREATER THAN THE FIRST NUMBER — 202

LABEL THE BRIEF CORRECT ANSWER AS A FIRST LABEL AND LABELING THE AT LEAST ONE DETAILED CORRECT ANSWER AS AT LEAST ONE SECOND LABEL — 204

GENERATE, USING THE LABELS AND THE ANSWERS, A LOSS FUNCTION FOR A REINFORCEMENT LEARNING ALGORITHM — 206

TRAIN THE RLM USING THE REINFORCEMENT LEARNING ALGORITHM AND THE LOSS FUNCTION TO GENERATE A TUNED RLM — 208

END

*FIG. 2*

● <u>INPUT TO REASON LANGUAGE MODEL:</u>

--'WHAT IS 2 + 3?'

● <u>OUTPUT OF REASON LANGUAGE MODEL PRIOR TO TRAINING:</u>

300 {
--"THE MODEL WAS ASKED WHAT IS TWO PLUS THREE. WE CAN CONSIDER THE NUMBER '2' TO BE TWO INSTANCES OF THE NUMBER '1.' WE ALSO CAN CONSIDER THE NUMBER '3' TO BE THREE INSTANCES OF THE NUMBER '1.' WHEN WE COUNT THE TOTAL NUMBER OF INSTANCES OF THE NUMBER '1' FOR THE NUMBERS '2,' AND '3,' WE END UP WITH FIVE INSTANCES OF THE NUMBER '1.'

302 { THEREFORE THE ANSWER TO THE QUESTION IS '5'.

● <u>OUTPUT OF TUNED REASON LANGUAGE MODEL AFTER TRAINING:</u>

● <u>INPUT TO REASON LANGUAGE MODEL:</u>

--FACTOR THE QUADRATIC EXPRESSION: $X^2 - 4X + 3$.

● <u>OUTPUT OF REASON LANGUAGE MODEL PRIOR TO TRAINING:</u>

402 {
--WE WANT TO FIND TWO BINOMIALS THAT, WHEN MULTIPLIED, RESULT IN $X^2 - 4X + 3$.
--THINK ABOUT WHAT NUMBERS MULTIPLY TO 3 AND ADD UP TO -4 (THE COEFFICIENT OF THE MIDDLE TERM). THE NUMBERS -1 AND -3 SATISFY THIS CONDITION.

400 { --THEREFORE, THE FACTORED FORM IS (X - 1)(X - 3).

● <u>OUTPUT OF TUNED REASON LANGUAGE MODEL AFTER TRAINING:</u>

402 {
--WE WANT TO FIND TWO BINOMIALS THAT, WHEN MULTIPLIED, RESULT IN $X^2 - 4X + 3$.
--THINK ABOUT WHAT NUMBERS MULTIPLY TO 3 AND ADD UP TO -4 (THE COEFFICIENT OF THE MIDDLE TERM). THE NUMBERS -1 AND -3 SATISFY THIS CONDITION.

400 { --THEREFORE, THE FACTORED FORM IS (X - 1)(X - 3).

*FIG. 4*

500
COMPUTING
SYSTEM

COMPUTATIONALLY EFFICIENT REASONING LANGUAGE MODELS

BACKGROUND

A language model is a type of machine learning model that generates an output in a human-readable language. A language model is often referred to as a generative artificial intelligence (AI) model.

One type of language model is a large language model. A large language model may be a type of machine learning model known as a neural network. The neural network is trained to receive a natural language input and to generate a natural language output. For example, the large language model may be instructed to analyze a large body of text and to output a summary of the large body of text.

A large language model is termed "large" because of the number of parameters and nodes the model has. A parameter is a changeable value that reflects a relationship between two nodes in the neural network. A large language model may have hundreds of billions of parameters. In the near future, large language models may have trillions of parameters.

A specific type of large language model is a reasoning large language model (a "reasoning model"), such as an o1 model (by OpenAI) or d1 (by DeepSeek). A reasoning model outputs not only the answer, but also outputs the chain of thought (i.e., the reasoning) by which the reasoning model determined the final output.

A technical problem arises in the use of reasoning models. Because such models are so large, the computational complexity of executing the models may lead to undesirable latency (i.e., an undesirable time taken to process the input and generate the output). Undesirable latency occurs even in modern computers operating at gigahertz frequencies. Therefore, the technical problem is increasing the processing efficiency of executing reasoning models in order to reduce the total number of processor flops used when executing reasoning models.

SUMMARY

One or more embodiments provide for a method of increasing a computational efficiency of a pretrained reasoning language model (RLM) including a number of nodes in a number of layers, and further including a number of weights indicating relationships among nodes between any two layers of the number of layers. The method includes executing, in a number of executions, the RLM on a query to generate a number of answers having a number of lengths. The method also includes executing a classification model on the number of answers to identify a brief answer including a first number of tokens and at least one detailed answer including a second number of tokens greater than the first number. The method also includes labeling the brief answer as a first label and labeling the at least one detailed answer as at least one second label. The method also includes generating a loss function for a reinforcement learning algorithm. The loss function is generated using a combination of the first label, the at least one second label, the brief answer, and the at least one detailed answer. The method also includes training the RLM using the reinforcement learning algorithm and the loss function. Training modifies the number of weights and the relationships among the nodes. Training generates a tuned RLM trained to generate fewer tokens in response to an input, relative to the pretrained RLM. The tuned RLM includes a higher computational efficiency than the pretrained RLM.

One or more embodiments provide for another method. The method includes receiving a query to a reasoning language model (RLM). The method also includes executing the RLM on the query. During executing, the RLM generates a first intermediate output and a second intermediate output. The method also includes executing, prior to generating a next intermediate output, a classification model on the second intermediate output to generate a prediction that the second intermediate output is redundant to the first intermediate output. The method also includes commanding, responsive to the prediction, the RLM to cease generating intermediate outputs. The method also includes commanding RLM to transmit the first intermediate output as a final output.

One or more embodiments provide for another method. The method includes receiving a query to a reasoning language model (RLM). The method also includes executing the RLM on the query. During executing, the RLM generates an intermediate output. The method also includes executing, prior to generating a next intermediate output, a classification model on the intermediate output to generate a predicted complexity of a final output of the RLM. The method also includes determining whether to proceed to generate the next intermediate output or to terminate execution of the RLM.

Other aspects of one or more embodiments will be apparent from the following description and the appended claims.

BRIEF DESCRIPTION OF DRAWINGS

FIG. 2 shows a flowchart of a method for computationally efficient reasoning language models, in accordance with one or more embodiments.

FIG. 3 and FIG. 4 show examples of the differences between computationally efficient reasoning language models, in accordance with one or more embodiments.

Like elements in the various figures are denoted by like reference numerals for consistency.

DETAILED DESCRIPTION

Figure 1A:
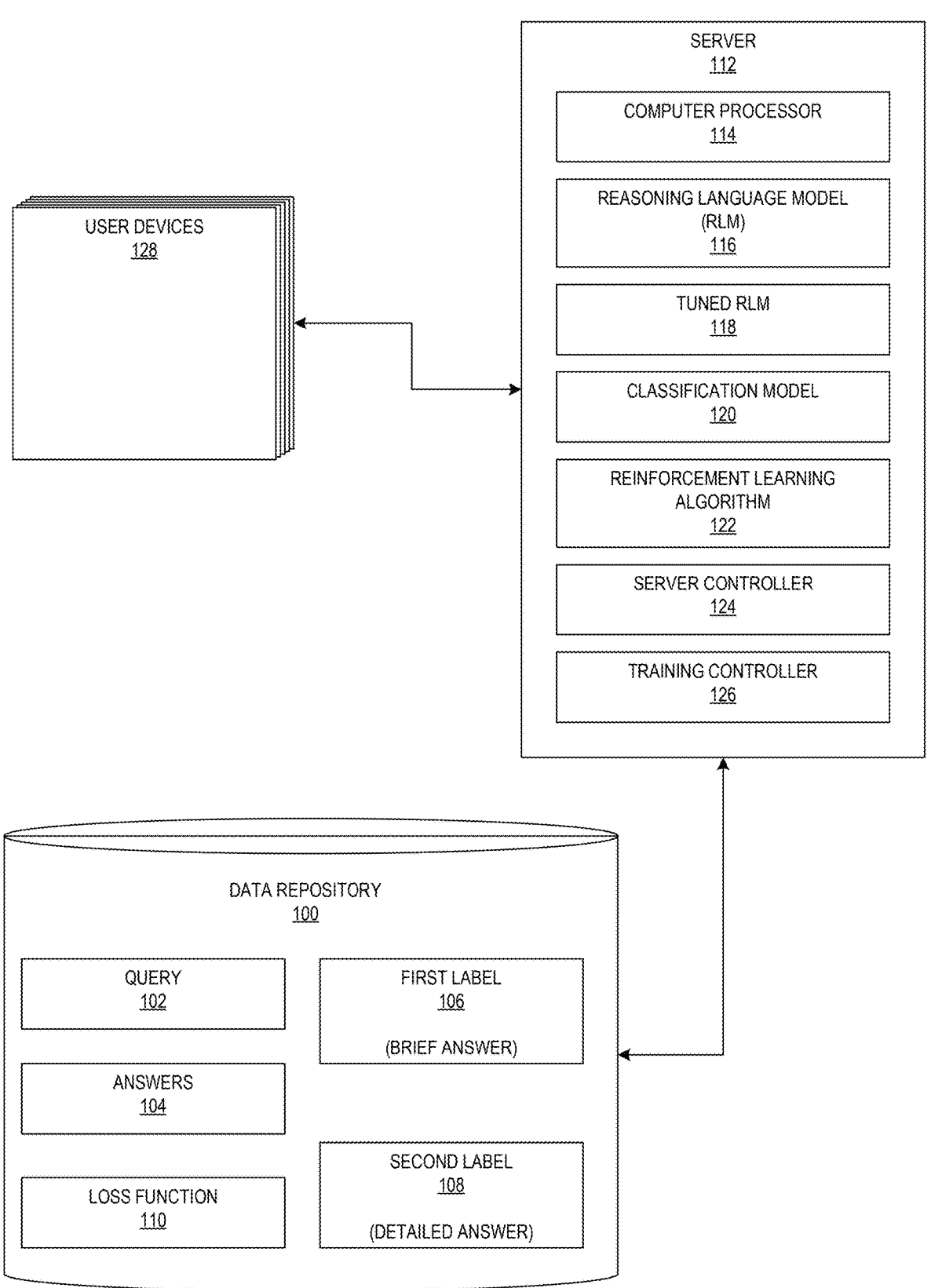
FIG. 1A and FIG. 1B show a computing system, in accordance with one or more embodiments.

One or more embodiments are directed to solving the above-identified technical problem by providing for computationally efficient reasoning language models. Briefly, the technical solution involves modifying the parameters of a reasoning model, and therefore the relationships between the nodes of the reasoning model, through the use of a classification model (i.e., a classification machine learning model) to detect the generation of unnecessary or redundant reasoning steps. The reasoning model is then trained accordingly, thereby modifying the parameters of the reasoning model, and hence the relationships between the nodes of the reasoning model. The result of training is a tuned reasoning model (also referred to as a "tuned model.") The tuned model generates a correct answer with fewer tokens (e.g., characters, words, phrases, sentences, etc.) than the reasoning model prior to training according to one or more embodiments. Because the tuned model generates fewer tokens, when the computer processor executes the tuned model, fewer processing flops are used. Accordingly, the tuned model is computationally efficient relative to the prior version of the model, and hence the tuned model conserves computing resources. In this manner, the technical problem of undesirable latency is mitigated when executing the tuned model.

However, one or more embodiments also preserve the accuracy of the reasoning model. As explained in more detail below, and as shown by the comparison of FIG. 3 to FIG. 4, the tuned model still outputs a desirable amount of reasoning when additional reasoning is useful. However, the tuned model generates less reasoning (or no reasoning) when additional reasoning would be wasteful of computing resources.

In somewhat more detail, the technical solution begins with executing the original version of the reasoning model on one or more queries. The same query may be submitted to the reasoning model multiple times in order to generate different outputs, because the output of a reasoning model is not always the same, even if the input is the same. As a result, multiple answers are generated. The answers have different lengths (i.e., have different numbers of tokens).

Then, a classification model (a type of machine learning model) takes the answers, from above, as input. The classification model outputs values that indicate the shortest (briefest) and longest (most detailed) answers. In an embodiment, the classification model may be executed after any incorrect answers (e.g., hallucinatory answers) are removed from the set of answers. Thus, the classification model operates on correct answers.

Next, the correct answers are labeled. Brief answers are given a first label (e.g., "shortest answer," or "brief answer," or "briefer answer"). More detailed answers are given a second label (e.g., "longer answer," or "detailed answer," or "more detailed answer.") The labels are used in the following step.

Then, a specific type of loss function is generated using the first and second labels, as well as the answers. The loss function is known as a reinforcement learning algorithm. In general, a loss function is an algorithm or function that is used to modify the parameters of the reasoning model during training. The reinforcement learning algorithm, during training, forces the parameters of the neural network to punish detailed answers and to favor briefer answers.

Then, a training process is executed on the reasoning model using the reinforcement learning algorithm as the loss function. The training process is described with respect to FIG. 1B. The result of training is the tuned model. The tuned model has parameters that change the relationships among the nodes of the tuned model. As a result, the tuned model is less likely to output detailed answers and more likely to output briefer answers. However, the tuned model is still trained to generate the desired reasoning behind the final output of the tuned model. (The "ultimate" output of the model is the final answer of the model, without the chain of reasoning.) Thus, the tuned model remains likely to output sufficient reasoning to make the reasoning and final output of use to a user, but to do so with a fewer number of tokens (i.e., a more succinct reasoning). An example of a difference between an original reasoning model and a tuned model is, again, shown by comparing FIG. 3 to FIG. 4.

As explained above, because the tuned model generates fewer tokens, fewer processor flops are used to execute the function of the tuned model on the nodes and parameters of the tuned model. Accordingly, one or more embodiments provide for a more computationally efficient reasoning model that reduces undesirable latency and conserves physical processing resources.

One or more embodiments also may further refine the output of the tuned model during inference. "Inference" is the stage of model use where a new query, for which an answer is desired, is provided as input to the tuned model and the tuned model is executed on that input to generate the reasoning and the final output.

For example, during execution of the tuned model, the classification model may be executed on intermediate outputs of the tuned model. In other words, the output of the tuned model is checked, token by token, as the tuned model outputs tokens sequentially. If the classification model determines that an intermediate token is redundant to the prior intermediate token, then a command is sent to the reasoning model to cease generating reasoning tokens, and instead to generate and return the final output. In this manner, still fewer tokens may be generated during the inference face, and accordingly still further computational efficiency may be achieved.

Thus, one or more embodiments provide for an "overthinking" detection module. "Overthinking," as used here, does not refer to human reasoning, but rather refers to the output of redundant or unneeded reasoning steps by a reasoning model during execution of the reasoning model on a computer. The overthinking detection model monitors the outputs of the reasoning model, detects redundancies, and decides whether additional reasoning steps are beneficial.

One or more embodiments also provide for a self-training data generator. The data generator collects the reasoning model's responses across multiple samples, and identifies solutions that yield correct answers with the fewest number of tokens.

The self-training data generated above is used by a preference optimization engine. The preference optimization engine may be the reinforcement learning algorithm described above. The preference optimization engine (or reinforcement learning algorithm) is used to train the reasoning model to generate a tuned model. The tuned model is more likely to generate briefer correct answers and briefer reasoning, relative to the original reasoning model prior to training.

One or more embodiments also provide for an adaptive reasoning controller. The adaptive reasoning controller decides whether to truncate or continue the chain of thought process of the reasoning model based on real-time complexity estimates. The adaptive reasoning controller helps ensure that reflection or double-check solutions are output by the reasoning model only if the problem appears sufficiently complex. As a result, briefer answers are generated for straightforward questions, thereby drastically reducing token overhead.

Finally, one or more embodiments provide for an efficiency metric monitor. The monitor tracks two core metrics: Outcome efficiency and process efficiency. Outcome efficiency is the percentage of tokens that contributed to obtaining the correct answer. Process efficiency is the degree to which additional solution rounds offer genuinely new (i.e., non-redundant) perspectives in the chain of reasoning output by the reasoning model.

Conventional large language models may generate multistep reasoning to improve the accuracy of the final output of the models. However, such models do not selectively reduce chain-of-thought steps for simple problems, leading to "overthinking" (i.e., outputting more tokens than are necessary to convey the reasoning of the model).

Prior attempts to limit the output reasoning models may include setting a token limit or a step limit on the output of the reasoning model. While such a technique may reduce the number of tokens output by the reasoning model, the output of such prior models can show too few reasoning steps. As a result, the output of such a reasoning model may be truncated prematurely, thereby causing the reasoning, the final output, or both to be incorrect.

Attention is now turned to the figures. FIG. 1A shows a computing system, in accordance with one or more embodiments. The system shown in FIG. 1A includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a query (102). The query (102) is a natural language instruction to language model, such as a reasoning language model (e.g., RLM (116)) described below. The query (102) may be expressed as a question or as a command. The query (102) may be a training query, in which case the purpose of entering the query is to generate a number of the answers (104) (described below). The query (102) also may be an inference query, in which case the purpose of entering the query is to obtain an answer (e.g., from the tuned RLM (118) during inference time, as described with respect to FIG. 3 or FIG. 4).

The data repository (100) also stores one or more answers (104). In an embodiment, the answers (104) are outputs of the RLM (116) prior to training the RLM (116). Specifically, the answers (104) may be generated, as described with respect to FIG. 2, as part of the training process that ultimately results in the tuned RLM (118). Such answers (104) also may be referred to as training answers, as such answers (104) are generated during the training of the RLM (116), as described with respect to FIG. 2.

However, in another embodiment, the answers (104) may be one or more answers that are output by the tuned RLM (118). In this case, the answers (104) may be the desired output of the tuned RLM (118), such as shown in FIG. 3 or FIG. 4. Such answers (104) also may be referred to as inference answers, as such answers (104) are generated during the inference phase of using the tuned RLM (118), as described with respect to FIG. 3 or FIG. 4.

The answers (104) may be "brief" or may be "detailed." "Brief" and "detailed" are ascertained with respect to some other answer in the answers (104). Thus, for example, one of the answers (104) may be "brief" or "detailed" as compared to another of the answers (104). In particular, a correct answer to the query (102) is "brief" or "detailed" relative to another correct answer in the answers (104) to the same query (102).

In general a "brief" or "detailed" answer may be ascertained quantitatively by evaluating the number of tokens in two correct answers to the same query (102). A token is a letter, character, word, phrase, paragraph, or some other predefined consistent length of text. In many cases, a token is a word. However, as indicated, a token may be a letter, or a phrase, or some other predetermined length of text. Accordingly, the "brief" answer has fewer tokens (e.g., fewer words) than the "detailed answer." Thus, in an embodiment, a "brief" answer is shorter (in terms of the number of tokens in an answer) than a "detailed" (or longer) answer. In any case, the terms "brief" and "detailed" are quantitatively ascertainable because the terms are determinable by comparing the number of tokens in two of the answers (104) to the same query (102).

The data repository (100) also stores a first label (106). While the terms "first" and "second" may be interchangeable in different embodiments, the term "first label (106)" is a convenient reference to a label that is applied to a brief answer from among the answers (104).

In general, a "label" is a computer data structure that is associated with or appended to another computer data structure. In one or more embodiments, a "label" (i.e., the first label (106) or the second label (108)) is a data structure that stores computer readable data that is appended to or associated with one of the answers (104). Thus, the first label (106) is a computer readable data structure appended to a data structure that stores one of the answers (104) or that is otherwise associated with one of the answers (104). Specifically, the first label (106) stores computer readable data that indicates one of the answers (104) is a "brief" answer.

Similarly, the second label (108) is a computer readable data structure appended to a data structure that stores one of the answers (104) or that is otherwise associated with one of the answers (104). Specifically, the second label (108) stores computer readable data that indicates one of the answers (104) is a "detailed" answer.

However, as indicated above, the terms "first" and "second" could be interchanged (e.g., the first label (106) instead is a label associated with a detailed answer and the second label (108) instead is a label associated with a brief answer). Generation and use of the labels (i.e., the first label (106) and the second label (108)) is described with respect to FIG. 2.

The system shown in FIG. 1A may include other components. For example, the system shown in FIG. 1A also may include a server (112). The server (112) is one or more computer processors, data repositories, communication devices, and supporting hardware and software. The server (112) may be in a distributed computing environment. The server (112) is configured to execute one or more applications, such as the RLM (116), the tuned RLM (118), the classification model (120), the reinforcement learning algorithm (122), the server controller (124), and the training controller (130). An example of a computer system and network that may form the server (112) is described with respect to FIG. 5A and FIG. 5B.

The server (112) includes a computer processor (114). The computer processor (114) is one or more hardware or virtual processors which may execute computer readable program code that defines one or more applications, such as the RLM (116), the tuned RLM (118), the classification model (120), the reinforcement learning algorithm (122), the server controller (124), and the training controller (130). An example of the computer processor (114) is described with respect to the computer processor(s) (502) of FIG. 5A.

The server (112) includes, hosts, or otherwise executes a RLM (116). The term "RLM" is defined as "reasoning language model." The RLM (116) is a language model that is trained and programmed to generate not only an answer to the query (102), but the reasoning why the language model generated the answer. For example, the RLM (116) may be a neural network trained to perform natural language analysis and responses (i.e., a language model). The language model is "large," as the language model may include millions or billions of nodes in the neural network and may have hundreds of billions of parameters. A parameter is a value that represents an association between two nodes between adjacent layers of nodes in the neural network. A parameter thus is one of hundreds of billions of numbers that are used in the execution of the large language model that is the RLM (116).

The server (112) includes, hosts, or otherwise executes a tuned RLM (118). The tuned RLM (118) is a revised version of the RLM (116), after the training method of FIG. 1B and FIG. 2 has been performed on the RLM (116). In particular, the process of training the RLM (116) changes the parameters of the RLM (116). As a result, the tuned RLM (118) is a different model than the RLM (116), and produces different results than the RLM (116), even if the underlying structure of the nodes and layers of nodes in the RLM (116) and the tuned RLM (118) are similar to each other. As shown and described in FIG. 3 and FIG. 4, the tuned RLM (118) is computationally more efficient than the RLM (116), thereby reducing latency and solving the technical problems described above.

The server (112) includes, hosts, or otherwise executes a classification model (120). The classification model (120) is a machine learning model (e.g., a logistic regression model, or some other classification machine learning model). The classification model (120) is trained to classify the answers (104) as either "brief" or "detailed" and to output the first label (106) or the second label (108) for each of the answers (104). Use of the classification model (120) is descried with respect to FIG. 2.

The server (112) includes, hosts, or otherwise executes a reinforcement learning algorithm (122). The reinforcement learning algorithm (122) is a specialized form of loss function. A loss function is described in more detail with respect to FIG. 1B (e.g., loss function (188)). Briefly, however, the loss function (i.e., the reinforcement learning algorithm (122)) is used to train the RLM (116) and thereby transform the RLM (116) to the tuned RLM (118).

In an embodiment, the reinforcement learning algorithm (122) may be a direct preference optimization (DPO) algorithm. However, other reinforcement learning algorithms may be used, such as proximal policy optimization (PPO), monolithic preference optimization without reference model (ORPO), Kahneman & Tversky's optimization (KTO), or the simple preference optimization (SimPO).

The reinforcement learning algorithm (122), such as the DPO algorithm, increases the relative log probability of brief answers (104) to detailed answers (104). In one or more embodiments, the loss function (110) of the server (112) may be expressed as follows:

$$\mathcal{L}_{DPO}(\pi_\theta; \pi_{ref}) = -\mathbb{E}_{(x, y_w, y_1) \sim \mathcal{D}} \left[ \log_\sigma \left( \beta \log \frac{\pi_\theta(y_w \mid x)}{\pi_{ref}(y_w \mid x)} - \beta \log \frac{\pi_\theta(y_1 \mid x)}{\pi_{ref}(y_1 \mid x)} \right) \right]$$

In the above equation, the term $\mathcal{L}_{DPO}$ represents the loss function. The term $\pi_\theta$ represents the language model (i.e. the RLM (116)) policy at any given iteration of training. The term $\pi_{ref}$ represents the base reference policy for the initial model. The term $$-\mathbb{E}_{(x, y_w, y_1) \sim \mathcal{D}}$$

is an operator that operates on queries, x, to produce pairs of briefer answers, $y_1$, and more detailed answers, $y_2$. The term $y_w$ refers to an answer that has a label that is applied to the briefest correct answer to a given question. The term $\mathcal{D}$ is a static dataset of comparisons, where $$\mathcal{D} = \{\{x^{(i)}, y_w^{(i)}, y_l^{(i)}\}_{i=1}^N.$$

The term "i" refers to the "$i^{th}$" instance of an answer under consideration. The term y, denotes a detailed answer, which is not preferred. The term "log" is a mathematical operator. The term $\beta$ is a parameter controlling the deviation from the base reference policy $\pi_{ref}$. Thus, the above loss function, $\mathcal{L}_{DPO}$, fits an implicit reward in the operation of the RLM (116) using a parameterization whose optimal policy is Ite.

The server (112) also may include a server controller (124). The server controller (124) is software or application specific hardware which, when executed by the computer processor (114), controls and coordinates operation of the software or application specific hardware described herein. The server (112) may execute the method of FIG. 2. The server controller (124) also may control and coordinate execution of the RLM (116), the tuned RLM (118), the classification model (120), the reinforcement learning algorithm (122), the server controller (124) itself, and the training controller (130).

The server (112) also may include a training controller (130). The training controller (130) is software or application specific hardware which, when executed by the computer processor (114), trains one or more machine learning models (e.g., the RLM (116), the tuned RLM (118), the classification model (120), or the reinforcement learning algorithm (122)). The training controller (130) is described in more detail with respect to FIG. 1B.

The system shown in FIG. 1A also may include one or more user devices (128). The user devices (128) are computing systems (e.g., the computing system (500) shown in FIG. 5A) that communicate with the server (112).

The user devices (128) may be considered remote or local. A remote user device is a device operated by a third-party (e.g., an end user of a chatbot) that does not control or operate the system of FIG. 1A. Similarly, the organization that controls the other elements of the system of FIG. 1A may not control or operate the remote user device. Thus, a remote user device may not be considered part of the system of FIG. 1A.

In contrast, a local user device is a device operated under the control of the organization that controls the other components of the system of FIG. 1A. Thus, a local user device may be considered part of the system of FIG. 1A.

Figure 1B:
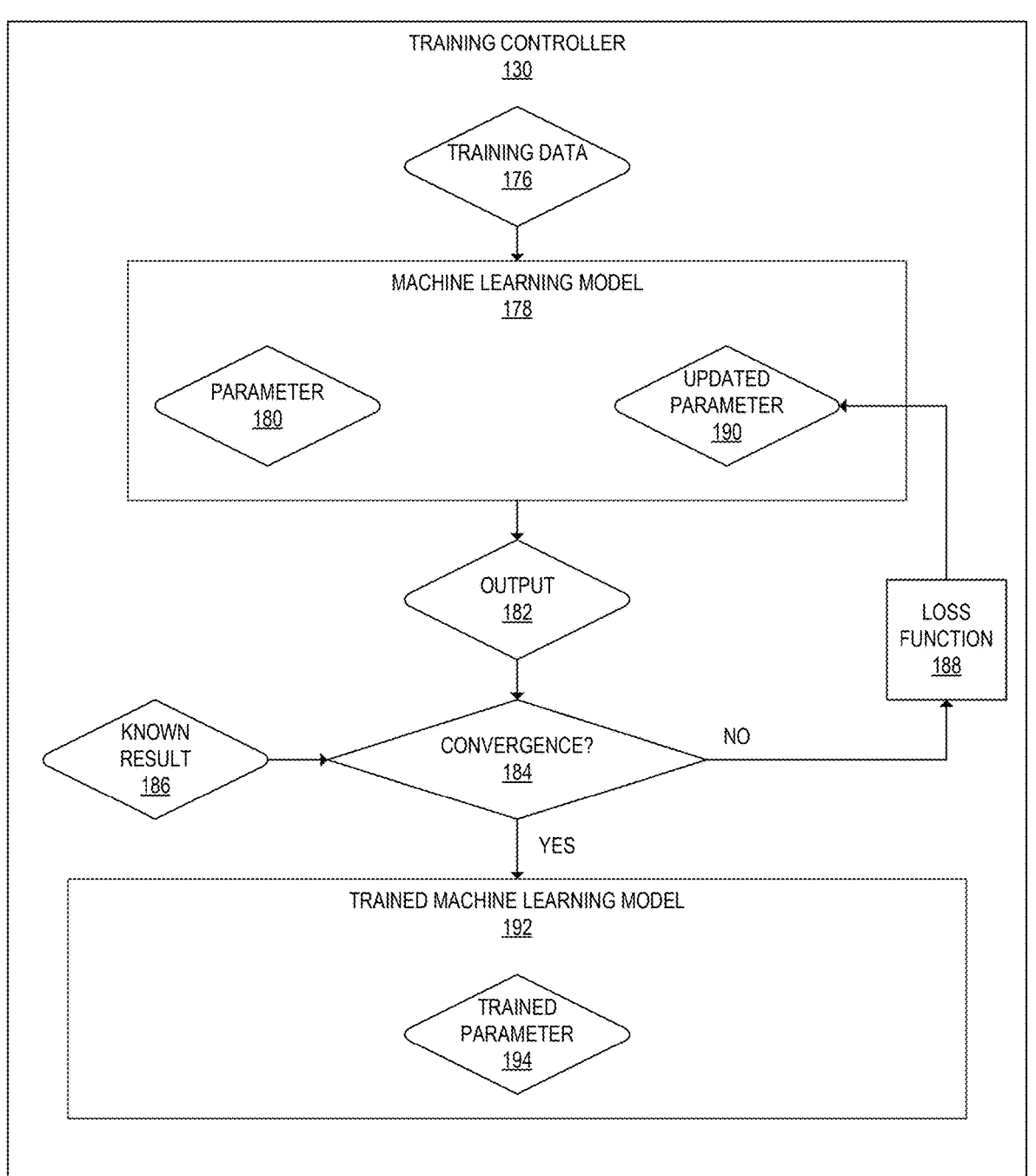

Attention is turned to FIG. 1B, which shows the details of the training controller (130). The training controller (130) is a training algorithm, implemented as software or application specific hardware, that may be used to train one or more of the machine learning models described with respect to the computing system of FIG. 1A.

In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some predetermined amount, or until some other termination condition occurs. After training, the final adjusted model is applied to unknown data (i.e., data for which the actual result is not known) in order to make predictions.

Some machine learning models may be applied to vector data structures. A vector is a computer readable data structure. A vector may take the form of a matrix, an array, a graph, or some other data structure. However, a frequently used vector form is one by N matrix, where each cell of the matrix represents the value for one feature. As described above, a feature is a topic of data (e.g., a color of an object, the presence of a word or alphanumeric text, a physical measurement type, etc.). A value is a numerical or other recorded specification of the feature. For example, if the feature is the word "cat," and the word "cat" is present in a corpus of text, then the value of the feature may be "1" (to indicate a presence of the feature in the corpus of text).

In one or more embodiments, some of the data in the data repository (100) of FIG. 1A may be stored in the form of one or more vectors. For example, the query (102), answers (104), first label (106), and second label (108) (all of FIG. 1A) may be converted into vector data structures. The vector data structures may form the training data (176).

The training data may be labeled. The labels represent a known result. Thus, a label applied to an instance of the output may be "correct" or "incorrect" (i.e., the output of the tuned RLM (118) was evaluated to be correct or incorrect). The labels may be the first label (106) and the second label (108), as defined with respect to FIG. 1A.

Thus, the training data (176) may be data for which the final result is known with certainty. If the prediction does not match the label, then the parameters of the layers in the machine learning model (178) (e.g., the RLM (116), the tuned RLM (116), or the classification model (120) of FIG. 1A) may be updated and the training process iterated.

The training data (176) is provided as input to the machine learning model (178), which may be the RLM (116), the tuned RLM (118), or the reinforcement learning algorithm (122) of FIG. 1A. The machine learning model (178) may be characterized as a program that has adjustable parameters. The program is capable of learning and recognizing patterns to make predictions. The output of the machine learning model (178) may be changed by changing one or more parameters of the algorithm, such as the parameter (180) of the machine learning model (178). The parameter (180) may be one or more parameters, the application of a sigmoid function, a hyperparameter, or possibly many different variations that may be used to adjust the output of the function of the machine learning model (178). The parameter (180), more specifically, may be any of the parameters (P1, P2, etc.) described with respect to FIG. 1C.

One or more initial values are set for the parameter (180). The machine learning model (178) is then executed on the training data (176). The result is an output (182), which is a prediction, a classification, a value, or some other output which the machine learning model (178) has been programmed to output.

The output (182) is provided to a convergence process (184). The convergence process (184) is programmed to achieve convergence during the training process. Convergence is a state of the training process, described below, in which a predetermined end condition of training has been reached. The predetermined end condition may vary based on the type of machine learning model (178) being used (supervised versus unsupervised machine learning), or may be predetermined by a user (e.g., convergence occurs after a set number of training iterations, described below).

In the case of supervised machine learning, the convergence process (184) compares the output (182) to a known result (186). The known result (186) is stored in the form of labels for the training data (176). For example, the known result (186) for a particular entry in an output (182) vector of the machine learning model (178) may be a known value, and that known value is a label that is associated with the training data (176).

Continuing the example of supervised machine learning model training, a determination is made whether the output (182) matches the known result (186) to a predetermined degree. The predetermined degree may be an exact match, a match to within a prespecified percentage, or some other metric for evaluating how closely the output (182) matches the known result (186). Convergence may occur when the known result (186) matches the output (182) to within a prespecified percentage. When many predictions are involved, then convergence may occur when more than a threshold number of predictions correctly match the corresponding labels.

For example, the threshold may be 95%. In this case, when the accuracy of the machine learning model (178) reaches 95% (representing that in 95 of 100 query predictions the machine learning model (178) correctly predicted an output) then convergence occurs.

In the case of unsupervised machine learning, the convergence process (184) may be compared to the output (182) or to a prior output in order to determine a degree to which the current output changed relative to the immediately prior output or to the original output. Once the degree of change fails to satisfy the threshold degree of change, then the machine learning model may be considered to have achieved convergence. Alternatively, an unsupervised model may determine pseudo labels to be applied to the training data and then achieve convergence as described above for a supervised machine learning model. Other machine learning training processes exist, but the result of the training process may be convergence.

If convergence has not occurred (a "no" at the convergence process (184)), then a loss function (188) is generated. The loss function (188) is a function which may be used to adjust the parameter (180) (one or more parameters, settings, etc.) in order to generate an updated parameter (190). In one or more embodiments, the loss function (188) is the loss function described with respect to the reinforcement learning algorithm (122) in FIG. 1.

The loss function algorithm attempts to guess how the parameter (180) may be changed so that the next execution of the machine learning model (178), using the training data (176) with the updated parameter (190), will have an output (182) that is more likely to result in convergence. In this manner, the next execution of the machine learning model (178) is more likely to match the known result (186) (supervised learning), or which is more likely to result in an output (182) that more closely approximates the prior output (one unsupervised learning technique), or which otherwise is more likely to result in convergence.

In any case, the loss function (188) is used to specify the updated parameter (190). As indicated, the machine learning model (178) is executed again on the training data (176), this time with the updated parameter (190). The process of execution of the machine learning model (178), execution of the convergence process (184), and the execution of the loss function (188) continues to iterate until convergence.

Upon convergence (a "yes" result at the convergence process (184)), the machine learning model (178) is deemed to be a trained machine learning model (192). The trained machine learning model (192) has a final parameter, represented by the trained parameter (194). Again, the trained parameter (194) shown in FIG. 1B may be multiple parameters. The trained machine learning model (192) may be, for example, the tuned RLM (118) of FIG. 1A.

During deployment, the trained machine learning model (192) with the trained parameter (194) is executed again, but this time on unknown data (which may be in the form of an unknown data vector) for which the final result is not known. The output of the trained machine learning model (192) is then treated as a prediction of the information of interest relative to the unknown data.

Figure 1C:
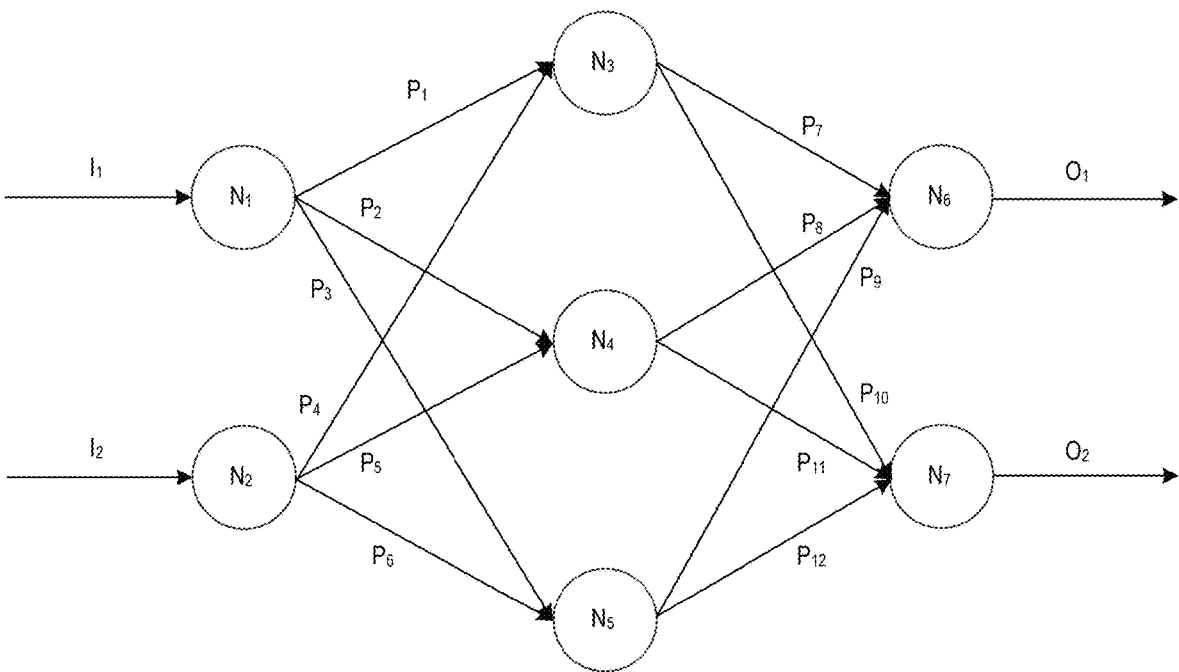
FIG. 1C shows an example of a neural network, in accordance with one or more embodiments.

The machine learning models used by the system of FIG. 1A and trained by the system of FIG. 1B may include neural networks. As mentioned above, neural networks may be the type of machine learning model that are the basis for a reasoning model or a tuned model. A neural network, as shown in FIG. 1C, includes a series of nodes arranged in layers. Each node performs a function when executed. The layers are arranged in vertical columns, as shown in FIG. 1, but need not be arranged as shown in FIG. 1C. Thus, for example, nodes $N_1$ and $N_2$ are one layer, nodes $N_3$, $N_4$, and $N_5$ are a second layer, and nodes $N_6$ and $N_7$ are a third layer.

The initial inputs to the neural network are provided as input to the first layer. Thus, $I_1$ is provided to node $N_1$ and input $I_2$ is provided to node $N_2$. $I_1$ and $I_2$ may be the same or different. The output of the neural network is the outputs of the last layer. Thus, the output of the neural network is $O_1$, the output of node $N_6$ and $O_2$, the output of node $N_7$. The outputs may be further modified before being returned to a user or to some other process.

The nodes are related to each other by parameters, indicated by the arrows. Thus, for example, parameter $P_1$ represents the relationship between $N_1$ and $N_3$; $P_2$ represents the relationship between $N_1$ and $N_4$, $P_6$ represents the relationship between $N_2$ and $N_5$, $P_{12}$ represents the relationship between $N_5$ and $N_7$, etc. Each relationship may be a number. The number is multiplied or otherwise combined with the output of a preceding node, thus affecting the input of the next node. Thus, for example, the input to node $N_3$ is a combination of the output of $N_1$ times $P_1$ and the output of node $N_2$ times $P_4$.

In all, the neural network shown in FIG. 3 includes 7 nodes ($N_1$, $N_2$, $N_3$, $N_4$, $N_5$, $N_6$, and $N_7$) having relationships $P_1$, $P_2$, $P_3$, $P_4$, $P_5$, $P_6$, $P_7$, $P_8$, $P_9$, $P_{10}$, $P_{11}$, and $P_{12}$. However, in a production scale reasoning model, there may be millions or billions of nodes and hundreds of billions of parameters.

Neural networks may operate using one or more layers of weights that may be sequentially applied to sets of input data, which may be referred to as input vectors. For each layer of a machine learning model, the weights of the layer may be multiplied by the input vector to generate a collection of products, which may then be summed to generate an output for the layer that may be fed, as input data, to a next layer within the machine learning model. The output of the machine learning model may be the output generated from the last layer within the machine learning model.

Multiple machine learning models may operate sequentially or in parallel. The output may be a vector or scalar value. The layers within the machine learning model may be different and correspond to different types of models. As an example, the layers may include layers for recurrent neural networks, convolutional neural networks, transformer models, attention layers, perceptron models, etc. Perceptron models may include one or more fully connected (also referred to as linear) layers that may convert between the different dimensions used by the inputs and the outputs of a model.

The machine learning models may be trained by inputting training data to a machine learning model to generate training outputs that are compared to expected outputs. For supervised training, the expected outputs may be labels associated with a given input. For unsupervised learning, the expected outputs may be previous outputs from the machine learning model. The difference between the training output and the expected output may be processed with a loss function to identify updates to the weights of the layers of the model, as described in FIG. 1B. After training on a batch of inputs, the updates identified by the loss function may be applied to the machine learning model to generate a trained machine learning model. The loss function may be the reinforcement learning algorithm (122) of FIG. 1A.

While FIG. 1A, FIG. 1B, and FIG. 1C show a configuration of components, other configurations may be used without departing from the scope of one or more embodiments. For example, various components may be combined to create a single component. As another example, the functionality performed by a single component may be performed by two or more components.

FIG. 2 shows a flowchart of a method for computationally efficient reasoning language models, in accordance with one or more embodiments. The method of FIG. 2 may be implemented using the system of FIG. 1A, FIG. 1B, and FIG. 1C. One or more of the steps may be performed on or received at one or more computer processors. FIG. 2 may be characterized as a method of increasing a computational efficiency of a pretrained reasoning language model (RLM). The RLM includes a number of nodes in a number of layers, and further includes a number of weights indicating relationships among nodes between any two layers. The method of FIG. 2 may be executed using a server controller programmed to implement the steps described below.

Step 200 includes executing, in a number of executions, the RLM on a query to generate a number of answers having a number of lengths. For example, a query may be submitted as input to the RLM 1,000 times. The RLM will output 1,000 outputs, most of which (or all of which) will be different than the first output generated by the RLM. The outputs may be different due to the complexity of the model. Note however, that most of the outputs will be correct answers, though the answers will be worded differently.

In a variation of the method of FIG. 2, prior to executing the classification model at step 202 below, the method may include identifying incorrect answers from the available answers. In this case, the method also may include eliminating, prior to executing the classification model at step 202, the incorrect answers. As a result, correct answers remain after step 202.

In an embodiment, step 202 may be repeated before proceeding to step 202, with different queries. Thus, for example, there may be multiple sets of answers, with each set of answers including many answers that correspond to one of the queries.

In any case, after step 202, multiple correct answers are generated by the RLM. The answers have varying lengths; thus, some of the answers are brief, and some are detailed.

Step 202 includes executing a classification model on the number of answers to identify a brief answer including a first number of tokens and at least one detailed answer including a second number of tokens greater than the first number. The classification model is defined above with respect to FIG. 1. The input to the classification model are the answers generated at step 200.

The output of the classification model are classifications that are applied to or associated with the answers. The classifications indicate at least "brief" answers and "detailed" answers. However, the classifications may include a "briefest" (i.e., the answer with the fewest number of tokens among the answers). Thus, the outputs of the classification model indicate that there may be two or three classifications of labels: briefest (the fewest tokens), brief (fewer than a predetermined number of tokens), and detailed (greater than or equal to a predetermined number of tokens).

Step 204 includes labeling the brief correct answer as a first label and labeling the at least one detailed correct answer as the at least one second label. Labeling may be performed by appending the data structure that contains the data defining a given answer with the label that corresponds to the given answer. Labeling may be performed by associating the data structure that contains the data defining a given answer with another data file that indicates the labels that should be applied to the corresponding answers.

In an embodiment, the answers also may follow the classification types. For example, the classification types include at least "brief" answers (i.e., the first label) and "detailed" answers (i.e., the second label). However, one of the answers also may be associated with a "briefest" label (i.e., the answer that contains the fewest number of tokens among the answers generated by submitting the query to the RLM multiple times).

The answers and the labels associated with or appended to the answers form the basis of the training data. The training data is used in step 208 to train the RLM.

Step 206 includes generating a loss function for a reinforcement learning algorithm. The loss function is generated using a combination of the first label, the at least one second label, the brief answer, and the at least one detailed answer. The loss function may be generated by inserting the data into the loss function defined with respect to the reinforcement learning algorithm (122) described with respect to FIG. 1. As described above, the loss function includes a reward model that rewards the brief answer and penalizes the at least one detailed answer.

Step 208 includes training the RLM using the reinforcement learning algorithm and the loss function. Training may be performed as described with respect to FIG. 1B. Briefly, training executes the RLM on the training data multiple times, changing the RLM each time based on the loss function, and continuing to repeat until convergence. Upon convergence, the final version of the RLM (i.e., the RLM with the parameters defined at convergence) is the tuned RLM.

Thus, training modifies the number of weights and the relationships among the nodes. Accordingly, training generates a tuned RLM trained to generate fewer tokens in response to an input, relative to the pretrained RLM.

The tuned RLM has a higher computational efficiency than the pretrained RLM. The tuned RLM is computationally more efficient than the pretrained RLM because the tuned RLM outputs fewer tokens. Thus, the layers of the neural network that form the basis of the RLM are executed fewer times to generate fewer tokens, thereby conserving computational resources. Additionally, the speed of executing the tuned RLM is generally faster than the speed of executing the pretrained RLM, because fewer tokens are generated and thus the layers of the neural network are commanded to execute fewer times.

The method of FIG. 2 may be varied, such as by including more or fewer steps. For example, in an embodiment, the method also may include determining an outcome efficiency of the tuned RLM. In this case, the method also includes determining a process efficiency of the tuned RLM. Then, the method also includes generating, using the outcome efficiency and the process efficiency, a second loss function for the reinforcement learning algorithm. The second loss function and the reinforcement learning algorithm may be used to retrain the tuned RLM to generate a fine-tuned RLM.

The fine-tuned RLM may output correct answers that are shorter, in token count, than even the tuned RLM.

In still another embodiment, the method also may include receiving a new input. In this case, the method also includes executing the tuned RLM on the new input. During executing, the tuned RLM generates a first intermediate output and a second intermediate output. Each output is a next token that is generated as the output of the RLM. However, the RLM continues to execute to predict a next token. The execution of the RLM continues until the RLM determines that no next token should be generated (i.e., the answer being generated is determined as being complete).

In the extended method, prior to generating a next intermediate output (i.e., a third token) the classification model is executed on the second intermediate output (i.e., a second token output by the RLM) to generate a prediction that the second intermediate output is redundant to the first intermediate output (i.e., the first token output by the RLM). The classification may be that the second token produced by the RLM is redundant to the first token produced by the RLM. In this case, the method also includes commanding, responsive to the prediction, the tuned RLM to cease generating intermediate outputs. In other words, if the tuned RLM begins generating redundant tokens, the execution of the RLM may be interrupted prematurely.

In the above embodiment, the tuned RLM may be commanded to transmit the first intermediate output as a final output. Alternatively, the tuned RLM may be commanded to generate and return the final output.

In this manner, one or more embodiments contemplate further increasing the computational efficiency of the tuned RLM in real time during the inference phase of the use of the RLM. Stated differently, the tuned RLM may be made still more computational efficient when asked to process a new query by monitoring the token-by-token output of the RLM. If the RLM begins generating redundant tokens, then the execution of the RLM is terminated prematurely, thereby achieving further computational efficiency during the runtime execution of the RLM.

In still another variation, the method of FIG. 2 also may include receiving a new input. In this case, the method also includes executing the tuned RLM on the new input. During executing, the tuned RLM generates a first intermediate output. Then, the method also includes executing, prior to generating a next intermediate output, the classification model on the first intermediate output to generate a predicted complexity of a final output of the tuned RLM.

The predicted complexity may satisfy a complexity threshold. If the predicted complexity satisfies a threshold, then the method also may include permitting the tuned RLM to generate at least a second intermediate output. However, if the predicted complexity fails to satisfy a complexity threshold, then the method further may include commanding the tuned RLM to cease generating intermediate outputs. In this case, the first intermediate output may be returned as a final intermediate output.

Thus, still further computational efficiency may be achieved during run-time at the inference stage of the use of the RLM. Stated differently, the complexity of the answer being generated may be predicted by a monitoring classification model. The input to the complexity model is the current set of tokens output by the RLM. If the complexity exceeds the threshold, then the execution of the RLM may be terminated prematurely.

The method of FIG. 2 may be varied according to address other issues. For example, an alternate method may include receiving a query to a reasoning language model (RLM).

The alternate method then includes executing the RLM on the query. During executing, the RLM generates a first intermediate output and a second intermediate output. The alternate method then includes executing, prior to generating a next intermediate output, a classification model on the second intermediate output to generate a prediction that the second intermediate output is redundant to the first intermediate output. The alternate method then includes commanding, responsive to the prediction, the tuned RLM to cease generating intermediate outputs. The alternate method then includes commanding tuned RLM to transmit the first intermediate output as a final output.

In an embodiment, the above alternate method then may include training the classification model. Training may be performed by receiving a pair of answers.

The pair of answers includes a brief correct answer and a detailed correct answer including a greater number of tokens than the brief correct answer. The alternate method then includes executing the classification model on the pair of answers to generate an intermediate prediction that the detailed correct answer is redundant to the brief correct answer. The alternate method then includes comparing the intermediate prediction to a correct prediction that the detailed correct answer is redundant to the brief correct answer. The alternate method then includes generating, using the pair of answers, the intermediate prediction, and the correct prediction, a loss function. The alternate method then includes updating weights of the classification model using the loss function. Training the classification model repeats until convergence.

The method of FIG. 2 may be further varied according to address other issues. For example, an alternate method may include receiving a query to the RLM. The alternate method then includes executing the RLM on the query. During executing, the tuned RLM generates an intermediate output. The alternate method then includes executing, prior to generating a next intermediate output, the classification model on the intermediate output to generate a predicted complexity of a final output of the tuned RLM. The alternate method then includes determining whether to proceed to generate the next intermediate output or to terminate execution of the RLM.

If the predicted complexity satisfies a complexity threshold, then the method further includes permitting the tuned RLM to generate at least a second intermediate output. If the predicted complexity fails to satisfy the complexity threshold, then the method further includes terminating execution of the tuned RLM.

In an embodiment, the alternate method also includes executing the classification model on the intermediate output and on second intermediate input to generate a predicted complexity of a final output of the tuned RLM. The alternate method then includes determining that the predicted complexity fails to satisfy a complexity threshold. The alternate method then includes returning a combination of the intermediate output and the second intermediate output as a final output of the RLM.

Again, if the predicted complexity fails to satisfy a complexity threshold, then the method further includes commanding the tuned RLM to cease generating intermediate outputs and returning the first intermediate output as a final intermediate output. Otherwise, the execution of the RLM may be terminated.

The predicted complexity may include a prediction whether a next intermediate output adds to at least one of an accuracy or a diversity of reasoning of the intermediate output. If so, the RLM is permitted to continue execution and generating tokens. If not, the RLM execution is terminated prematurely.

In an embodiment, the classification model may be trained. Training the classification model may be performed by receiving a pair of answers. The pair of answers includes a brief correct answer and a detailed correct answer including a greater number of tokens than the brief correct answer. The method then includes executing the classification model on the pair of answers to generate an intermediate prediction that the detailed correct answer is a more complete answer than the brief correct answer. The alternate method then includes comparing the intermediate prediction to a correct prediction that the detailed answer is a more complete answer than the brief answer. The alternate method then includes generating, using the pair of answers, the intermediate prediction, and the correct prediction, a loss function. The alternate method then includes updating weights of the classification model using the loss function. Training the classification model repeats until convergence.

While the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

FIG. 3 and FIG. 4 show examples of the differences between computationally efficient reasoning language models, in accordance with one or more embodiments. The following examples are for explanatory purposes only and not intended to limit the scope of one or more embodiments. FIG. 3 and FIG. 4 highlight that one or more embodiments provide for a fine-tuned RLM that is both computationally efficient, and also accurate.

Specifically, both FIG. 3 and FIG. 4 show the difference between the operation of the RLM (116) and the tuned RLM (118) of FIG. 1A. More specifically, FIG. 3 shows that the tuned RLM (118) is more computationally efficient than the RLM (116) of FIG. 1A. FIG. 4 shows that the tuned RLM (118) is as accurate as the RLM (116) of FIG. 1A.

In FIG. 3, the input to both the RLM and the tuned RLM is, "What is 2+3?" The output of the RLM, prior to tuning, is a detailed explanation (300) of how the RLM arrived at the correct answer (302). Such a detailed explanation is not useful and generates a wasteful number of tokens. However, the output of the tuned RLM to the same query is simply the answer (304), which is: "5." Both answers are correct. Because the question and answer are so straightforward, no further explanation is desirable. Thus, a dramatic number of tokens are saved, thereby showing the computational efficiency of the tuned RLM, as well as the attendant improvement to the speed of the computer executing the tuned RLM. Note that the answer is correct in both cases.

In FIG. 4, a more complex question is posed to both the RLM and the tuned RLM, "Factor the quadratic expression: $X^2-4X+3$." The RLM, prior to training, outputs the answer (400) and the reasoning (402) for the answer. After training, the tuned RLM outputs the same reasoning (402) and answer (400). The reason that the answer (400) and reasoning (402) are the same for both versions of the model is that the input question is more complex, and the tuned model determined that the original reasoning happens to coincide with the briefest answer. In either case, the answer and the reasoning of both models are both correct.

From the above descriptions of the figures, one or more embodiments may be characterized as an adaptive overthinking mitigation system. The system of one or more embodiments analyzes the RLM's chain-of-thought for each query and decides whether additional reasoning steps are genuinely necessary or desirable. Through self-training and preference-optimization methods as described above, the RLM is guided to produce concise, but sufficiently complete solutions for simpler queries. Nevertheless, the RLM continues to show extended reasoning for complex tasks. One or more embodiments also incorporate metrics that help determine when subsequent reasoning rounds are redundant or repetitive. By trimming superfluous reasoning traces, one or more embodiments may reduce token usage without compromising answer quality.

One or more embodiments provide for an overthinking detection module. The overthinking detection module monitors the RLM's intermediate outputs at one or more layers of the neural networks. The overthinking detection module identifies signs of repeated or redundant reasoning on simple questions. The overthinking detection module uses a threshold-based or learned metric, such as comparing each new solution's contribution to accuracy or diversity, to decide whether additional reasoning steps are beneficial.

One or more embodiments also provide for a self-training data generator. The self-training data generator collects the RLM's responses across multiple samples (e.g., shortest, longest, or additional variations). The self-training data generator identifies which solutions yield correct answers with minimal chain-of-thought. The self-training data generator constructs pairs of "brief" (efficient, preferred solutions) vs. "detailed" (redundant, overlong, or longer solutions).

One or more embodiments provide for a preference optimization engine. The preference optimization engine employs fine-tuning algorithms (e.g., DPO, RPO, SimPO, defined above) to teach the RLM that shorter, more efficient responses are generally preferred, while still allowing for elaborate reasoning on hard problems. The preference optimization engine adjusts the RLM's internal policy so the RLM favors early correct solutions and penalizes excessive or repetitive solution rounds when the answer is already determined.

One or more embodiments provide for an adaptive reasoning controller. The adaptive reasoning controller, at inference time, may dynamically decide whether to truncate or continue the chain-of-thought based on real-time complexity estimates. The adaptive reasoning controller incorporates reflection or double-check solutions when the query appears sufficiently complex. The adaptive reasoning controller yields shorter responses for straightforward questions. Accordingly, token overhead may be drastically reduced.

One or more embodiments also provide for an efficiency metrics monitor. The efficiency metrics monitor may track two core metrics: outcome efficiency and process efficiency. Outcome efficiency is the percentage of tokens that contributed to obtaining the correct answer, relative to the total number of tokens output by the RLM. Process efficiency is the degree to which additional rounds of processing, and hence additional tokens output by the RLM, offer genuinely new perspectives. The efficiency metrics monitor helps the system self-regulate the extent of reasoning the LLM produces.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
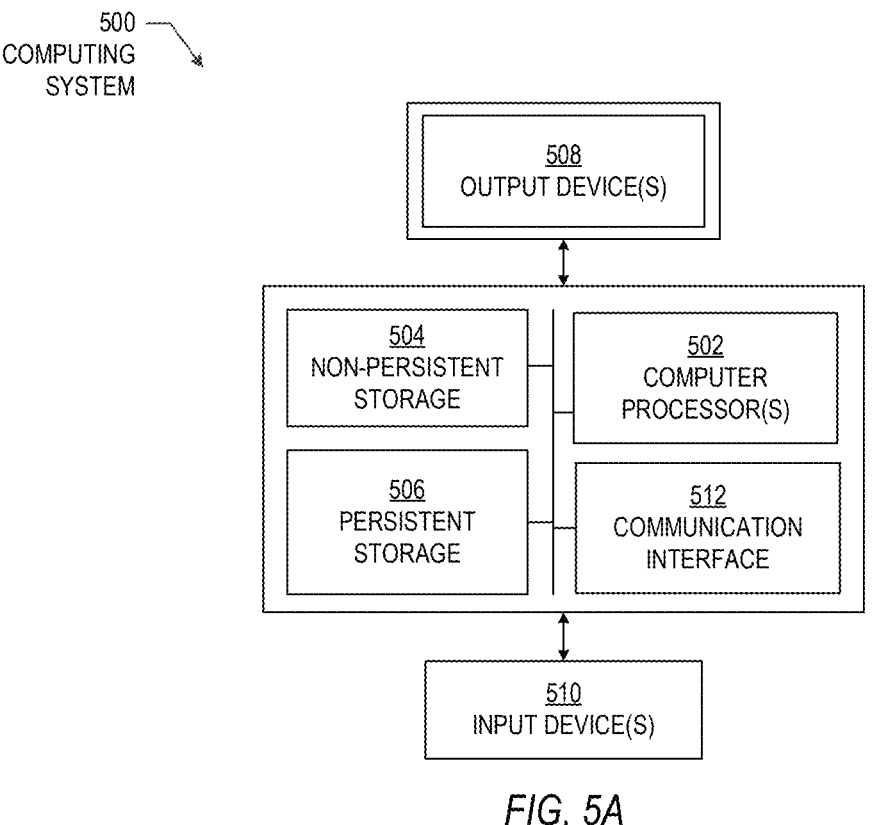
FIG. 5A and FIG. 5B show a computing system and network environment, in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN), such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium, such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
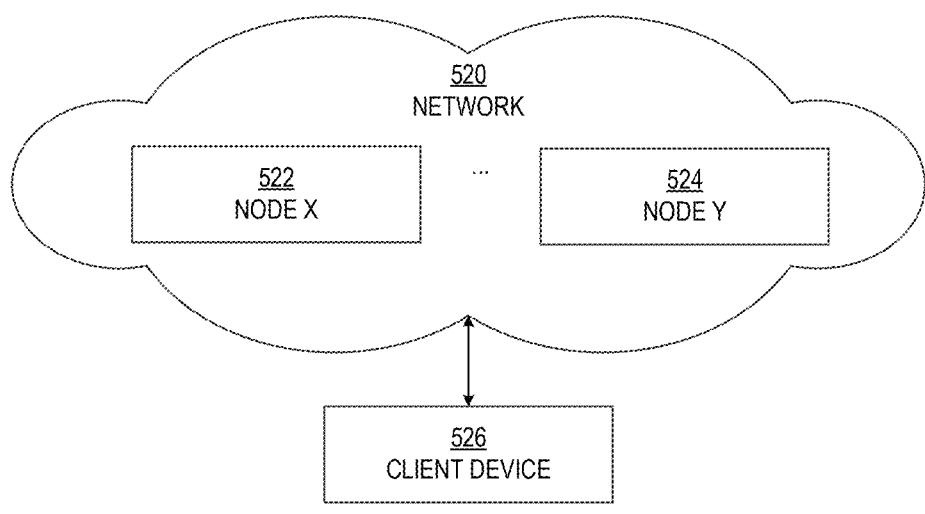

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof), such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method of increasing a computational efficiency of a pretrained reasoning language model (RLM) comprising a plurality of nodes in a plurality of layers, and further comprising a plurality of weights indicating relationships among nodes between any two layers of the plurality of layers, the method comprising:

executing, in a plurality of executions, the RLM on a query to generate a plurality of answers having a plurality of lengths;

executing a classification model on the plurality of answers to identify a brief answer comprising a first number of tokens and at least one detailed answer comprising a second number of tokens greater than the first number;

labeling the brief answer as a first label and labeling the at least one detailed answer as at least one second label;

generating a loss function for a reinforcement learning algorithm, wherein the loss function is generated using a combination of the first label, the at least one second label, the brief answer, and the at least one detailed answer;

training the RLM using the reinforcement learning algorithm and the loss function, wherein training modifies the plurality of weights and the relationships among the nodes, and wherein:

the loss function, using the combination of the first label, the at least one second label, the brief answer, and the at least one detailed answer, rewards the brief answer and penalizes the at least one detailed answer;

training generates a tuned RLM trained to generate fewer tokens in response to an input, relative to the pretrained RLM, and the tuned RLM comprises a higher computational efficiency than the pretrained RLM;

receiving a new input;

executing the tuned RLM on the new input, wherein, during executing, the tuned RLM generates a first intermediate output;

executing, prior to generating a next intermediate output, the classification model on the first intermediate output to generate a predicted complexity of a final output of the tuned RLM;

comparing the predicted complexity to a complexity threshold;

determining that the predicted complexity fails to satisfy the complexity threshold;

commanding, responsive to determining that the predicted complexity fails to satisfy the complexity threshold, the tuned RLM to cease generating intermediate outputs; and returning the first intermediate output as the final output.

2. The method of claim 1, wherein the loss function comprises a reward model that rewards the brief answer and penalizes the at least one detailed answer.

3. The method of claim 1, further comprising:

identifying, prior to executing the classification model, incorrect answers from the plurality of answers; and eliminating, prior to executing the classification model, the incorrect answers from the plurality of answers.

4. The method of claim 1, wherein the reinforcement learning algorithm is selected from the group consisting of a direct preference optimization algorithm, a monolithic preference optimization without reference model algorithm, and an odds ratio preference optimization algorithm, a Kahneman-Tversky optimization algorithm.

5. A method comprising:

receiving a query to a reasoning language model (RLM), wherein the RLM is trained using a loss function that combines:

a first label representing a brief answer, at least one second label representing at least one detailed answer, the brief answer, and the at least one detailed answer, wherein during training the loss function further rewarded the brief answer and penalized the at least one detailed answer;

generating, by the RLM in response to the query, a first token of a final output of the RLM;

generating, by the RLM after the first token, an intermediate token of the final output, wherein the intermediate token comprises a token generated prior to a final token output by the RLM;

executing, prior to generating a next intermediate token of the final output, a classification model on the intermediate token, to generate a predicted complexity of the final output of the RLM, wherein the predicted complexity comprises a prediction whether the next intermediate token of the final output adds to at least one of an accuracy or a diversity of reasoning of a combination of the first token and the intermediate token;

determining that the predicted complexity fails to satisfy a complexity threshold;

commanding, responsive to determining that the predicted complexity fails to satisfy the complexity threshold, the RLM to terminate execution immediately after generating the intermediate token and prior to generating the final output; and returning, responsive to terminating execution of the RLM, the first token and the intermediate token as a revised final output.

6. The method of claim 5, further comprising:

training the classification model by:

receiving a pair of answers, wherein the pair of answers comprises a brief correct answer and a detailed correct answer comprising a greater number of tokens than the brief correct answer, executing the classification model on the pair of answers to generate an intermediate prediction that the detailed correct answer is a more complete answer than the brief correct answer, comparing the intermediate prediction to a correct prediction that the detailed correct answer is more complete than the brief correct answer, generating, using the pair of answers, the intermediate prediction, and the correct prediction, the loss function, and updating weights of the classification model using the loss function.

7. The method of claim 5, wherein training the classification model repeats until convergence.

\* \* \* \* \*